(12) United States Patent
Xiong et al.

(10) Patent No.: US 8,917,911 B2
(45) Date of Patent: Dec. 23, 2014

(54) METHOD AND APPARATUS FOR LOCAL BINARY PATTERN BASED FACIAL FEATURE LOCALIZATION

(75) Inventors: Tao Xiong, Beijing (CN); Kongqiao Wang, Beijing (CN); Lei Xu, Beijing (CN); Jiangwei Li, Beijing (CN)

(73) Assignee: Nokia Corporation, Espoo (FI)

( * ) Notice: Subject to any disclaimer, the term of this patent is extended or adjusted under 35 U.S.C. 154(b) by 53 days.

(21) Appl. No.: 13/509,784

(22) PCT Filed: Dec. 31, 2009

(86) PCT No.: PCT/CN2009/076341
§ 371 (c)(1),
(2), (4) Date: May 14, 2012

(87) PCT Pub. No.: WO2011/079458
PCT Pub. Date: Jul. 7, 2011

(65) Prior Publication Data
US 2012/0321140 A1  Dec. 20, 2012

(51) Int. Cl.
*G06K 9/00* (2006.01)
*G06K 9/46* (2006.01)

(52) U.S. Cl.
CPC .... *G06K 9/00228* (2013.01); *G06K 2009/4666* (2013.01)
USPC ........................................................ 382/108

(58) Field of Classification Search
None
See application file for complete search history.

(56) References Cited

U.S. PATENT DOCUMENTS

2008/0205712 A1   8/2008  Ionita et al.
2009/0303342 A1*  12/2009 Corcoran et al. .......... 348/222.1
2013/0300891 A1*  11/2013 Bacivarov et al. ......... 348/222.1

FOREIGN PATENT DOCUMENTS

| CN | 1794265 A    | 6/2006  |
|----|--------------|---------|
| CN | 1949247 A    | 4/2007  |
| CN | 101561875 A  | 10/2009 |
| JP | 2006-107145 A| 4/2006  |
| JP | 2007-109234 A| 4/2007  |

OTHER PUBLICATIONS

Peyras, Julien, et al. "Segmented AAMs improve person-independent face fitting." In BMVC'07—Proceedings of the 18th British Machine Vision Conference. 2007.*
Su, Ya, et al. "Texture representation in AAM using Gabor wavelet and local binary patterns." Systems, Man and Cybernetics, 2009. SMC 2009. IEEE International Conference on. IEEE, 2009.*
Fasel, Ian, Bret Fortenberry, and Javier Movellan. "A generative framework for real time object detection and classification." Computer Vision and Image Understanding 98.1 (2005): 182-210.*
Li, Zhaorong, and Haizhou Ai. "Texture-constrained shape prediction for mouth contour extraction and its state estimation." Pattern Recognition, 2006. ICPR 2006. 18th International Conference on. vol. 2. IEEE, 2006.*

(Continued)

*Primary Examiner* — Nirav G Patel
(74) *Attorney, Agent, or Firm* — Alston & Bird LLP

(57) ABSTRACT

Various methods for local binary pattern based facial feature localization. One example method includes determining an eye state classification of an input image. The example method may also include selecting a texture model for a global shape and an associated mean shape based on eye center positions and the eye state classification, and adjusting locations of feature points defined by the mean shape based on the texture model for the global shape and an associated global shape model. Similar and related example methods and example apparatuses are also provided.

26 Claims, 9 Drawing Sheets

(56) References Cited

OTHER PUBLICATIONS

Kass et al., "Snakes: Active Contour Models", International Journal of Computer Vision, vol. 1, Issue 4, Jan. 1988, pp. 321-331.
Hinton et al., "Adaptive Elastic Models for Hand-Printed Character Recognition", In Advances in Neural Information Processing Systems, vol. 4, 1992, 8 pages.
Yuille et al., "Feature Extraction From Faces Using Deformable Templates", International Journal of Computer Vision, vol. 8, Issue 2, 1992, pp. 99-111.
Cootes et al., "Active Shape Models—Their Training and Application", Computer Vision and Image Understanding, vol. 61, Issue 1, Jan. 1995, pp. 38-59.
Cootes et al., "Active Appearance Models", IEEE Transactions on Pattern Analysis and Machine Intelligence, vol. 23, Issue 6, Jun. 2001, 16 pages.
Hou et al., "Direct Appearance Models", Proceedings of the IEEE Computer Society Conference on Computer Vision and Pattern Recognition, vol. 1, 2001, 6 pages.
Xue et al., "AI-EigenSnake: An Affine-Invariant Deformable Contour Model for Object Matching", Image and Vision Computing, vol. 20, Issue 2, Feb. 1, 2002, pp. 77-84.
Sclaroff et al., "Active Blobs: Region-Based, Deformable Appearance Models", Computer Vision and Image Understanding, vol. 89, Issues 2-3, Feb.-Mar. 2003, pp. 1-29.
Cootes et al., "Active Shape Model Search Using Local Grey-Level Models: A Quantitative Evaluation", In Proceedings of the British Machine Vision Conference, 1993, pp. 639-648.
Tong et al., "Robust Facial Feature Tracking Under Varying Face Pose and Facial Expression", The Journal of the Pattern Recognition Society, vol. 40, Issue 11, Nov. 2007, pp. 3195-3208.
Marcel et al., "Robust-To-Illumination Face Localization Using Active Shape Models and Local Binary Patterns", IDIAP Research Report, 06-47, Jul. 2006, pp. 1-20.
Ojala et al., "Multiresolution Gray-Scale and Rotation Invariant Texture Classification With Local Binary Patterns", IEEE Transactions on Pattern Analysis and Machine Intelligence, vol. 24, Issue 7, Jul. 2002, pp. 971-987.
Liu et al., "Hierarchical Shape Modeling for Automatic Face Localization", In Proceedings of the 7th European Conference on Computer Vision—Part II, vol. 2351, 2002, pp. 687-703.
Liu et al., "Automatic Facial Expression Recognition Based on Local Binary Patterns of Local Areas", WASE International Conference on Information Engineering, vol. 1, Jul. 10-11, 2009, pp. 197-200.
Mirhosseini et al., "A Hierarchical and Adaptive Deformable Model for Mouth Boundary Detection", Proceedings of International Conference on Image Processing, vol. 2, Oct. 26-29, 1997, pp. 756-759.
Heusch et al., "A Novel Statistical Generative Model Dedicated to Face Recognition", Image and Vision Computing, May 22, 2009, pp. 1-10.
International Search Report and Written Opinion received for corresponding International Patent Application No. PCT/CN2009/076341, dated Oct. 21, 2010, 12 pages.
Office Action for Chinese Application No. 200980162696.5 dated Jan. 13, 2014.

\* cited by examiner

METHOD AND APPARATUS FOR LOCAL BINARY PATTERN BASED FACIAL FEATURE LOCALIZATION

RELATED APPLICATIONS

This application is a National Phase entry of International Application No. PCT/CN2009/076314, filed Dec. 31, 2009.

TECHNICAL FIELD

Embodiments of the present invention relate generally to face recognition technology, and, more particularly, relate to a method and apparatus for local binary pattern based facial feature localization.

BACKGROUND

Face detection, face recognition, and facial tracking are finding an increasing number of uses and applications. The increase in potential applications for facial analyses has partly occurred as a result of the continuously increasing speed and capabilities of modern microprocessors. As a result, facial analysis can be used in a number of settings for various applications including biometrics, user interface applications, gaming application, social networking and other interpersonal commutations applications. The advancement in computing power of microprocessors has also made facial analysis functionality available on mobile devices, such as cell phones and other smart devices. Facial analysis may also be important going forward in relation to initiatives such as metadata standardization.

Although facial analysis techniques continue to improve, many current methods require either a high computation capability or suffer from limited face detection performance. Complicating issues, such as, faces not being oriented directly towards the camera or natural changes to the faces (e.g., eyes closed) can negatively impact the results of facial analyses. As applications for facial detection, recognition, and tracking are developed, these and other challenges should be overcome to provide further improvements in the area of facial analysis.

BRIEF SUMMARY

Example methods and example apparatuses are described herein that provide for local binary pattern based facial feature localization. In this regard, according to various example embodiments methods and apparatuses are described that perform robust and efficient feature localization based on local binary pattern models. According to some example embodiments, the local binary pattern models, both global models and component (e.g., eyes, mouth, etc.) models, may have associated categories for different states of the components (e.g., open eyes, closed eyes, etc.) facilitating selection of more precisely matched models for analysis of a face, A logarithm likelihood ratio describing joint probability densities may also be utilized in the generation of local binary pattern models used for facial analysis. Further, example embodiments of the present invention provide for adjusting the locations of initially determined feature points based on a number of techniques including, for example, mouth corner detection.

Various example methods and apparatuses of the present invention are described herein, including example methods for local binary pattern based facial feature localization. One example method includes determining an eye state classification of the modified input image, and selecting a texture model for a global shape and an associated mean shape based on eye center positions and the eye state classification. In this regard, the texture model for the global shape may be a local binary pattern model determined based on a probability density. The example method may also include adjusting locations of feature points defined by the mean shape based on the texture model for the global shape and an associated global shape model.

An additional example embodiment is an apparatus configured for local binary pattern based facial feature localization. The example apparatus comprises at least one processor and at least one memory including computer program code, the at least one memory and the computer program code configured to, with the at least one processor, cause the apparatus to perform various functionality. The example apparatus may be caused to perform determining an eye state classification of the modified input image, and selecting a texture model for a global shape and an associated mean shape based on eye center positions and the eye state classification. In this regard, the texture model for the global shape may be a local binary pattern model determined based on a probability density. The example apparatus may also be caused to perform adjusting locations of feature points defined by the mean shape based on the texture model for the global shape and an associated global shape model.

Another example embodiment is computer program product comprising a computer-readable storage medium having computer program code stored thereon, wherein execution of the computer program code causes an apparatus to perform various functionalities. Execution of the computer program code may cause an apparatus to perform determining an eye state classification of the modified input image, and selecting a texture model for a global shape and an associated mean shape based on eye center positions and the eye state classification. In this regard, the texture model for the global shape may be a local binary pattern model determined based on a probability density. Execution of the computer program code may also cause the apparatus to perform adjusting locations of feature points defined by the mean shape based on the texture model for the global shape and an associated global shape model.

Another example apparatus includes means for determining an eye state classification of the modified input image, and means for selecting a texture model for a global shape and an associated mean shape based on eye center positions and the eye state classification. In this regard, the texture model for the global shape may be a local binary pattern model determined based on a probability density. The example apparatus may also include means for adjusting locations of feature points defined by the mean shape based on the texture model for the global shape and an associated global shape model.

Another example embodiment is a computer-readable medium having computer program code stored therein, wherein execution of the computer program code causes an apparatus to perform various functionalities. The computer program code may cause an apparatus to perform determining an eye state classification of the modified input image, and selecting a texture model for a global shape and an associated mean shape based on eye center positions and the eye state classification. In this regard, the texture model for the global shape may be a local binary pattern model determined based on a probability density. The computer program code may also cause the apparatus to perform adjusting locations of feature points defined by the mean shape based on the texture model for the global shape and an associated global shape model.

BRIEF DESCRIPTION OF THE DRAWING(S)

Having thus described the invention in general terms, reference will now be made to the accompanying drawings, which are not necessarily drawn to scale, and wherein:

DETAILED DESCRIPTION

Figure 1:
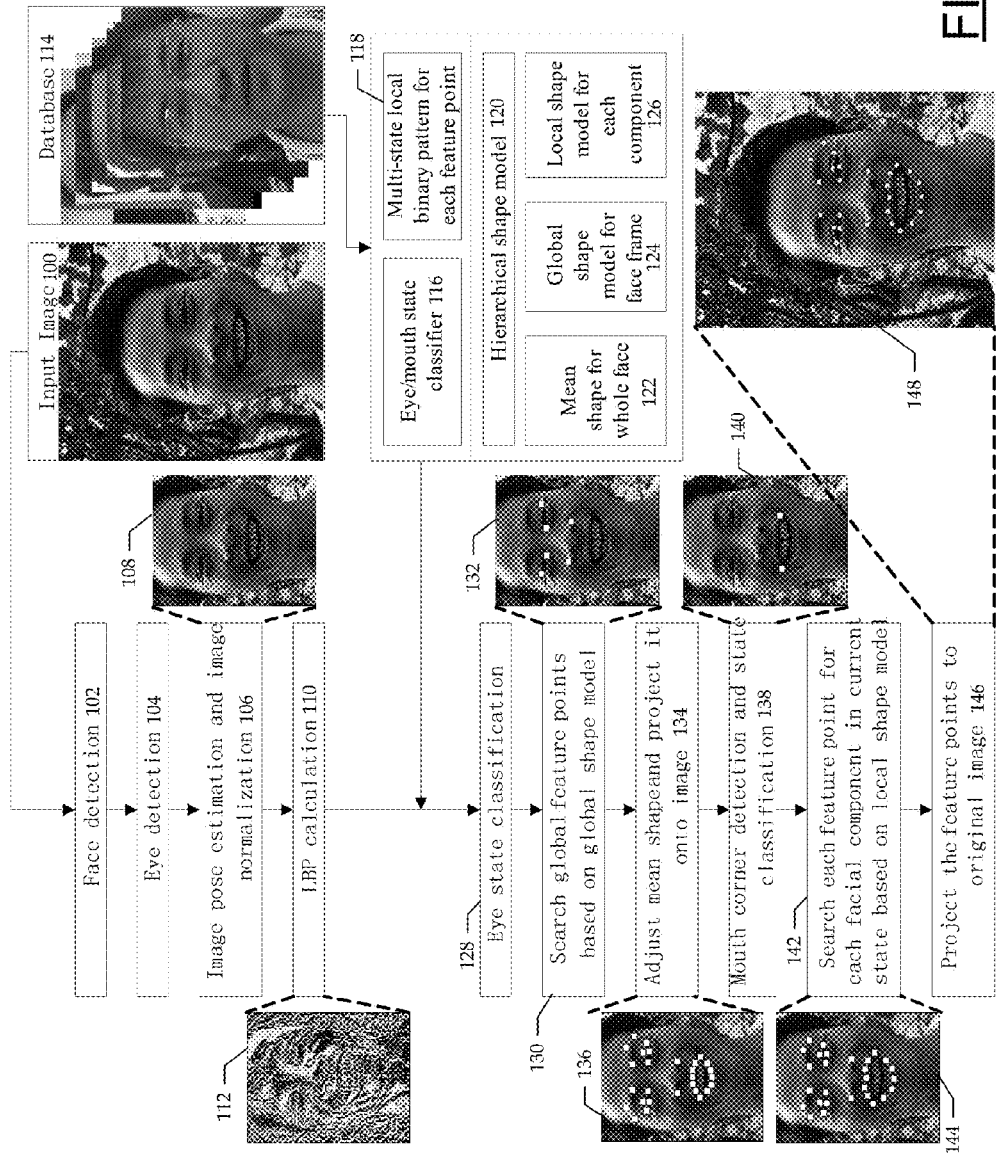
FIG. 1 illustrates an example method for generating and adjusting facial feature points according to an example embodiment of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments of the present invention, to refer to data capable of being transmitted, received, operated on, and/or stored.

As used herein, the term 'circuitry' refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

According to various example embodiments of the present invention, methods and apparatuses for local binary pattern based facial feature localization are provided. In this regard, techniques for generating and adjusting facial feature points in preparation for further facial analyses are described herein. Facial feature localization, according to various example embodiments, may provide for various face-oriented applications and solutions, such as, face avatar in video communication. Facial feature localization may also assist in the extraction of more accurate face local features for improving the performance of face recognition, face expression tracking, age or gender estimation, and the like. Facial analysis, via facial feature localization, may also have applications relating to social networking services and similar services involving personal interaction and communications.

According to various example embodiments, facial feature localization methods and apparatuses for performing facial feature localization are described herein that provide for increased efficiency and accuracy of positioning facial feature points. According to some example embodiments, computational overhead is reduced to facilitate utilization of various techniques described herein with, for example, mobile technology implemented in a mobile terminal or other mobile device. A hierarchical active shape model (ASM) may be applied to compensate for inaccuracies that may be introduced as a result of eye detection. Further, according to example embodiments, a texture model in the form of a local binary pattern (LBP)-based probability model may be utilized to describe the local texture structure near feature points and facial components (e.g., eyebrows, eyes, mouth, etc.) and modify the positions of feature points. Utilizing the texture model can result in relatively quick and accurate determinations of locations for feature points. A multi-state localization strategy may also be employed to handle large variations in components, such as eyes and mouths. An LBP-based eye/mouth-state classifier may be designed to distinguish the eye/mouth state of the component into two or three categories, such as closed, opened, and/or opened large. For each state, the corresponding probability model, based on the category, may be used, which can result in additional accuracy improvements. A gradient-based detector may also be used that is designed to estimate the position of a mouth corner using, for example, a Hough transform. As a result of some or all of these aspects, according to various example embodiments, improved facial feature localization may be performed as described below.

According to various example embodiments, a technique based on active shape model (ASM) analysis for localization may be utilized. According to various example embodiments, ASM techniques may utilize a model that includes a combination of a shape mode and a texture model. The shape model may be constructed via a PDM (point distribution model) and PCA (principle component analysis). The shape model may be comprised of a number of feature points that are associated with locations on a face. The shape model may include a mean shape and several variation modes of a shape (e.g., the eigenvectors of PCA, and eigenvalues of PCA). In some instances, merely relying upon the use of a single global shape model for the whole face may not provide sufficient accuracy due to the procedure being limited to a local minimum and resulting in a large bias and unaccounted for changes in the expression in the image of the face. To overcome some or all of these issues, example embodiments of the present invention may utilize a hierarchical structure for the shape model. Additionally, the texture model may be generated and used to update the positions of the feature points via a searching process. Some texture models are generated via a gray level profile or a Gabor-based texture model may be generated. However, in some instances, a grey level profile descriptor may not be sufficient to handle a facial component, such as a mouth, that has complex texture and variation. A Gabor wavelet-based descriptor may provide a robust result, but with a substantial increase in the computational complexity of the analysis. The following provides other examples for generating and utilizing alternative shape and texture models for performing facial feature localization.

Referring now to FIG. 1, an example method illustrated as a flow chart is provided for performing facial feature localization. The example method of FIG. 1 may be performed using a database 114 that may include an eye/mouth state classifier 116, multi-state local binary patterns for feature points 118, and a hierarchical shape model 120. The database 114 may include training images and associated data for any number of faces that may be used to generate the various models.

Figure 2:
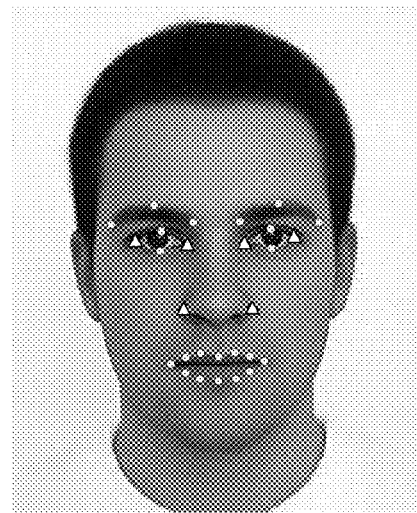
FIG. 2 illustrates a face image with feature points of a shape model according to an example embodiment of the present invention.

The hierarchical shape model 120 may include or be associated with a mean shape for a whole face model 122, a global shape model for a face frame 124, and a number of local shape models for each component 126. The hierarchical shape model may include two or more levels of shape models (e.g., the global shape model and the local shape models) and a mean shape of all feature points (e.g. 28 feature points). The first level of the hierarchical shape model may be the global shape model. Referring to FIG. 2, the global feature points (represented by triangles) may define the global shape of the face, which may be included in the global shape model. The second level of the hierarchical shape model may be comprised of multiple local shape models for various feature points of particular facial components. Referring again to FIG. 2, an eyebrows shape model may be generated based on the six feature points associated with the eyebrows. Two shape models for the eyes, an open eyes shape model and a closed eyes shape model, may be generated based on the 8 feature points associated the eyes, including the eye corner points. Note that, according to some example embodiments, the eye corner points are included in both the global model and the local eye shape model. The mouth may be associated with 3 states, that is closed mouth, small open mouth, and large open mouth, and a local shape model for each mouth state may be generated using the 12 points associated with the mouth. The mean shape for each local shape model may be part of the mean shape of all feature points. The mean shape of all feature points may be used in various analyses of a face, such as, an initial positioning of feature points for a localization analysis.

In this regard, according to various example embodiments, a face shape may be modeled by a predetermined number of points, such as, for example, 28 points as depicted in FIG. 2. The points may include fixed points (represented as triangles) and flexible points (represented as circles). In this regard, according to some example embodiments, the mouth corners and eyebrow tips may be flexible points, due to their potential for movement. The fixed points may, on the other hand, have a relatively stable structure, and shape variation may often be dependant on changes in the location of the flexible points.

Thus, according to some example embodiments, the fixed points may be the basis for determining pose parameters of the global face, since varying expressions may not affect the results. The collection of fixed points may be referred to as the global shape, and the global shape may be included in the global shape model for face frame 124 of the database 114.

Local shape models may also be generated and stored in the database 114 as the local shape model for each component 126. In this regard, a component may refer to one or both eyes, the mouth, or the nose. The local shape models may include the fixed and flexible points that are associated with the respective portion of the face. Further, different local shape models may be generated for each state of a facial component.

Figure 3:
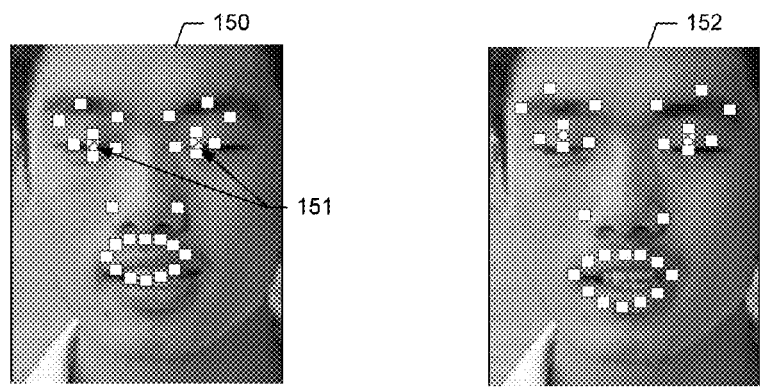
FIG. 3 illustrates the results of an adjustment to an initial shape according to an example embodiment of the present invention.

A trained mean shape may be generated and stored in the database 114 as the mean shape for the whole face 122 and may be used as the initial shape for the global shape model and the local shape models. As further described below, the input image 100 may be normalized by similarity transformation according to an eye detection result. Image 150 of FIG. 3 depicts an example mean shape as indicated by the points (represented by squares). Since, according to some example embodiments, the generated eye locations (cross-hatched squares 151) may not be accurate, generated pose parameters may be biased, especially in closed eye case as depicted in image 150 of FIG. 3. To bring the initial shape closer to the feature in the transformed image, the global shape may be updated using ASM, and updated pose parameters may be subsequently obtained. Accordingly, the whole mean shape may be adjusted by the global pose parameters to generate an updated initial shape as depicted in image 152 of FIG. 3. According to some example embodiments, compensation for the inaccuracies caused by eye detection maybe achieved. Similarly, the local shapes of the components may also be updated from this new initial shape.

As indicated above, the database 114 may also include a local binary pattern (LBP) probability model stored as the multi-state local binary pattern for each feature point 118. The LBP probability models may be used as texture models in the facial feature localization process. In this regard, the local texture may be modeled to generate a texture models for facial components in various states using an LBP descriptor. The LBP descriptor may be used together with a likelihood ratio to build an LBP probability model as a texture model. For each feature point, a texture model may be constructed to describe the local texture characteristics around the point. Since the eyebrows and nose may have only one state associated with them, a single texture model for each feature point associated with the eyebrows and the nose may be generated. Since two states for the eyes exist (open and closed), each feature point for the eyes may have two respective texture models. Similarly for the mouth, three texture models for each feature point may be generated since the mouth is associated with three different states.

Figure 4:
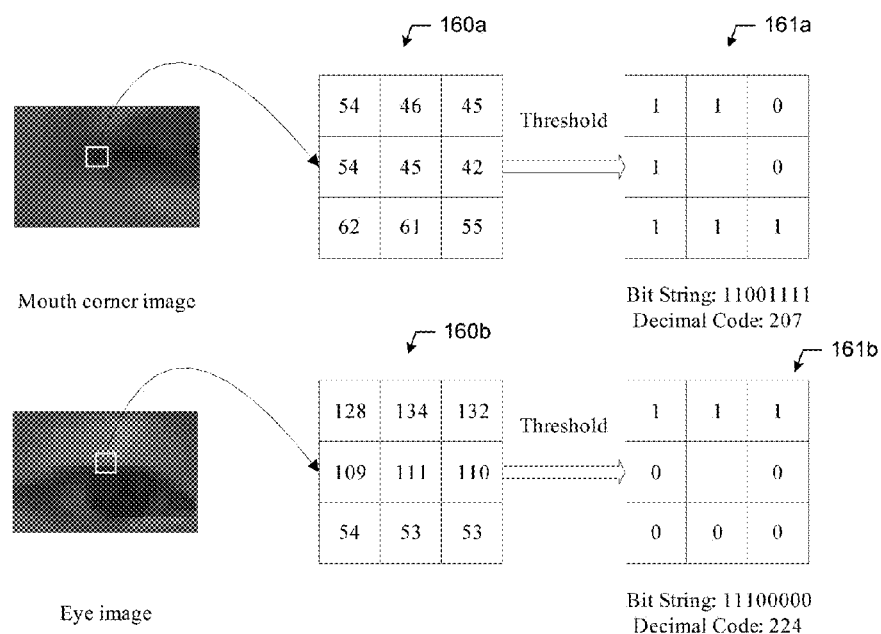
FIG. 4 illustrates example methods for calculating local binary patterns according to an example embodiment of the present invention.

The LBP descriptor used for generating the various texture models, $lbp_{8,1}$, may determine the relative magnitude relationship between a pixel and the pixel's neighborhood, and encode the magnitude relationship into a binary sequence. FIG. 4 describes example techniques for generating the binary sequence or a decimal code. The resultant value of $lbp_{8,1}$ may be an integer in [0, 255]. According to some example embodiments, a comparison may be made between the magnitude (e.g., gray-scale magnitude) of a target pixel and the target pixel's neighbors (e.g., immediate and possibly more distant neighbors). If the magnitude of the neighbor pixel is greater than the magnitude of the target pixel, then a binary "1" may be assigned to the associated pixel relationship. If the magnitude of the neighbor pixel is less than or equal to the magnitude of the target pixel, then a binary "0" may be assigned to the relationship. The binary values associated with the relationships may be combined to form a bit string, where the ordering of the bits may, for example, begin with the upper, left-most neighboring pixel then order may continue in a clockwise fashion around the target pixel. The resultant string may then be converted from a binary number to a decimal number, which may be referred to as the decimal code.

FIG. 4 illustrates two examples where decimal codes are generated for particular target pixels. In a first example, the target pixel is part of a mouth corner and in the second example, the target pixel is part of an eye image. As described above, comparisons are made between the target pixel (center pixel) and the neighboring pixels to determine the relationship between the magnitudes and assign the binary value. The magnitude maps 160a and 160b illustrate the magnitudes of the pixels that are used in the comparison. The relationship maps 161a and 161b illustrate the results of the comparisons and the assignment of binary values. Based on the relationship maps 161a and 161b the respective bit strings and decimal codes may be generated.

Figure 5:
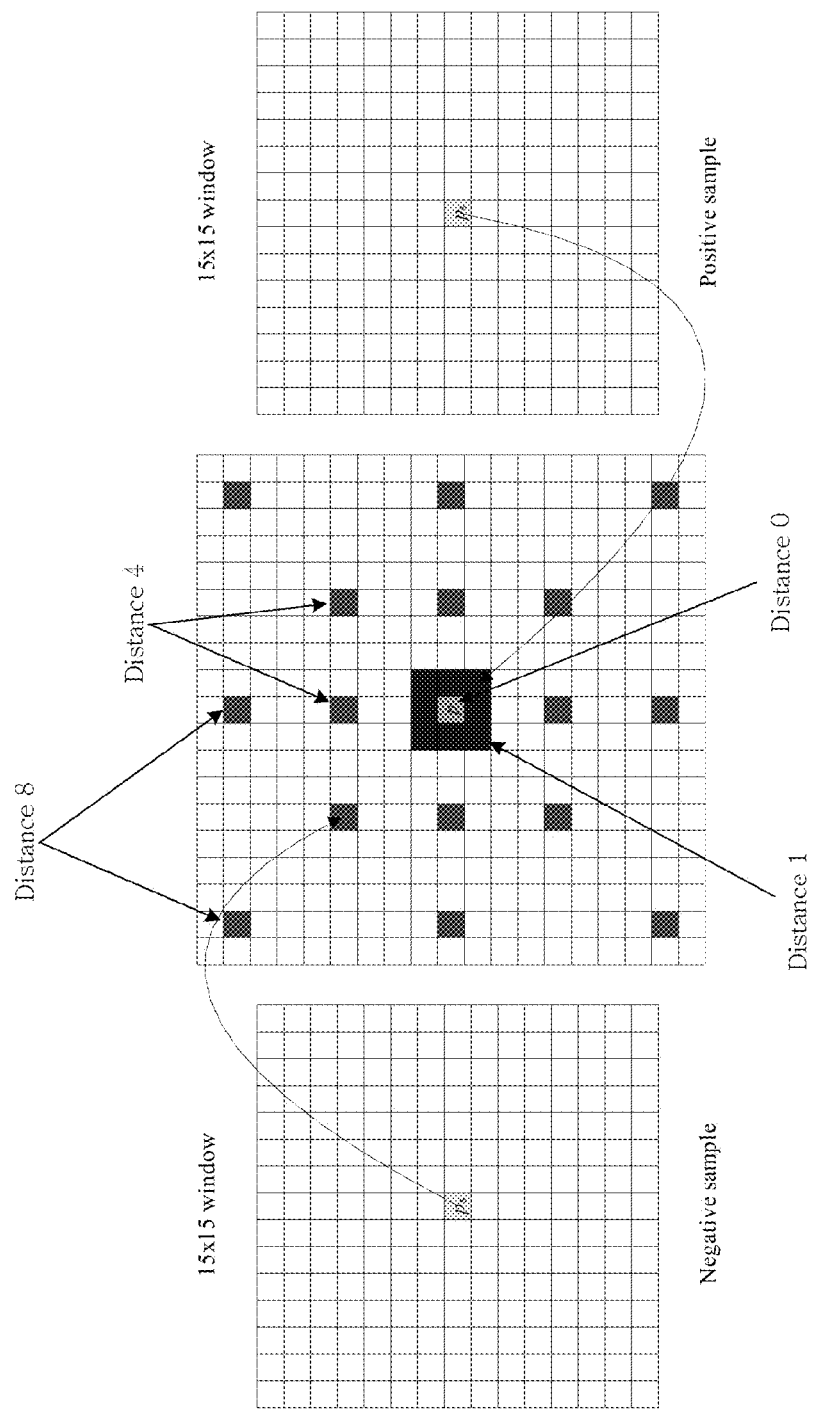
FIG. 5 illustrates an example technique for determining samples in a local binary pattern calculation according to an example embodiment of the present invention.

Additionally, for each feature point, p, in an aligned training image, where the training image is aligned based on a predetermined distance between the eye centers (e.g., 60), the lbp values in a window, such as the 15×15 windows depicted in FIG. 5, centered at specific point, $p_s$, may be calculated. According to some example embodiments, if the chessboard distance between $p_s$ and p is 0 or 1 as depicted in FIG. 5, the respective lbp values may be referred to as positive samples. According to some example embodiments, if the chessboard distance between $p_s$ and p is 4 or 8 as depicted in FIG. 5 (pixels with gray color), the respective lbp values may be referred to as negative samples.

Thus, within the 15×15 window, each pixel has an lbp value with a probability density function of $p(lbp_i|\omega_p)$ for a positive sample, or $p(lbp_i|\omega_n)$ for a negative sample. Accordingly, the joint probability density may be described as:

$$p(lbp|\omega_p) = \prod_{i=1}^{225} p(lbp_i|\omega_p) \quad (1)$$

or $$p(lbp|\omega_n) = \prod_{i=1}^{225} p(lbp_i|\omega_n) \quad (2)$$

Figure 6:
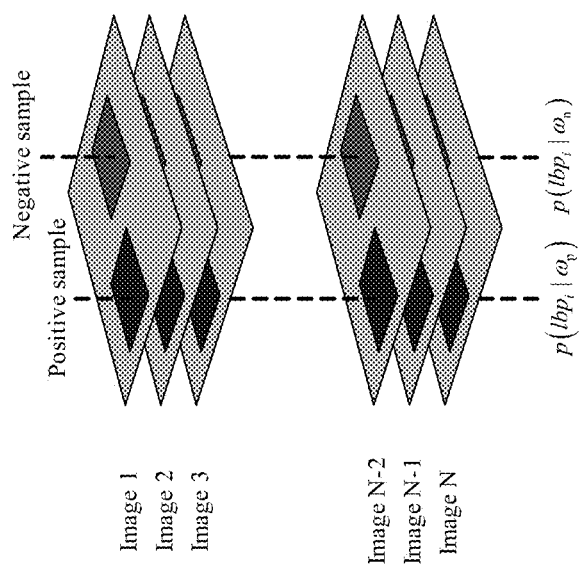
FIG. 6 illustrates an example local binary pattern probability model according to an example embodiment of the present invention.

For the ith feature point, 9 positive samples and 16 negative samples may be calculated in each image. Thus, for an example training database with 2,245 images, 20,205 positive samples and 35,920 negative samples may be generated. For each pixel in the window, the densities $p(lbp_i|\omega_p)$ and $p(lbp_i|\omega_n)$ may be estimated using the positive and negative samples, respectively, as depicted in FIG. 6. Accordingly, the logarithm likelihood ratio function for each pixel may be described as:

$$\lambda_i = \log \frac{p(lbp_i|\omega_p)}{p(lbp_i|\omega_n)} \quad (3)$$

and may be generated in a two-dimensional look-up table. In this regard, one dimension may be the pixel index i and the other dimension may be the lbp value.

To determine a location for a corresponding feature point in a given image, the lbp values for each location in the window may be calculated. The joint logarithm likelihood ratio function may be described as:

$$\lambda = \log \frac{p(lbp|\omega_0)}{p(lbp|\omega_n)} = \log \prod_{i=1}^{225} \frac{p(lbp_i|\omega_p)}{p(lbp_i|\omega_n)} = \sum_{i=1}^{225} \lambda_i \quad (4)$$

and may be obtained by the look-up table. According to some example embodiments, the determined location may be the location with the maximum logarithm likelihood.

Using the forgoing scheme for eye components, the training images may be divided into two categories, closed and open. As mentioned above, texture models for each state may be generated. Similarly, for the eyebrows and nose, which are associated with a single state, may have respective single texture models generated. Since the mouth has three states, three texture models for each point may be generated based on the state.

According to some example embodiments, generating multiple texture models in this fashion may be distinguished from LBP representations that involve the calculation of histograms around the feature point in the spatial domain. Rather, the probability density functions $p(lbp_i|\omega_p)$ and $p(lbp_i|\omega_n)$ are calculated in the image-dimension (e.g., the vertical direction as depicted in FIG. 6), which, according to some example embodiments, contains more information than a spatial LBP histogram thereby providing for high computation efficiency and a more robust result against noise and illuminance variations.

As indicated above, the database 114 may also include eye/mouth state classifier information 116. The eye/mouth state classifier may also be based on the texture models or LBP probability models. In this regard, for an eye state, the training images may be divided into two categories, open and closed. For example, a 15×29 window centered at the eye center may be used for positive and negative samples. For each state, the logarithm likelihood ratio function may be obtained by equation (3), that is, for closed state $\lambda_{i,c}$ and open state $\lambda_{i,o}$, i=1, . . . , 435. For a given image, the position of the eye center may be obtained via eye detection. The joint logarithm likelihood ratio functions for the open and the closed states may be calculated by equation (4). As such, the state of the eye may be described as:

$$s_{eye} = \begin{cases} \text{Open}, & \lambda_o > \lambda_c \\ \text{Close}, & \lambda_o \leq \lambda_c, \end{cases} \quad (5)$$

The mouth state classifier may be similar. With respect to the mouth, three states may be defined, closed, small open, and large open. In different states, different texture models and component shape models may be selected to handle exaggerated expressions. Two windows centered at the two mouth corners may be used, and the positions of the mouth corners may be determined via mouth corner detection. For classification, $\lambda_C$, $\lambda_S$, $\lambda_B$, for each respective state (closed, small open or small, large open or big) may be calculated and the state of the mouth may be described as:

$$S_{mouth} = \begin{cases} \text{Close, if } \lambda_C \geq \lambda_S, \lambda_C \geq \lambda_B \\ \text{Small, if } \lambda_S > \lambda_C, \lambda_S \geq \lambda_B \\ \text{Big, if } \lambda_B > \lambda_S, \lambda_B > \lambda_C \end{cases} \quad (6)$$

Figure 7:
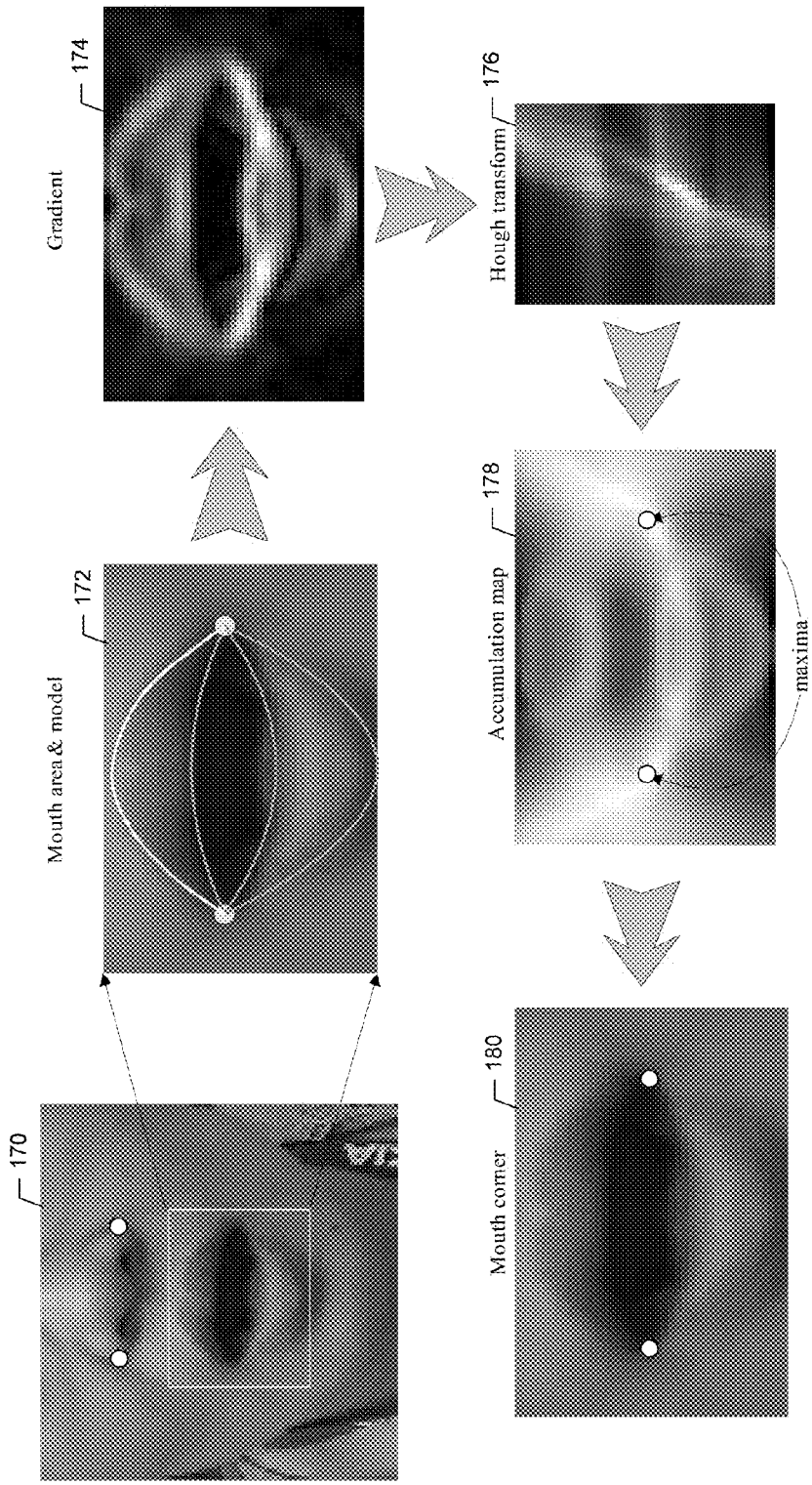
FIG. 7 illustrates mouth corner detection according to an example embodiment of the present invention.

To determine the corners of the mouth, the global shape model may be utilized for giving a coarse mouth area. The mouth location may be first estimated for mouth state classification due to the large individual differences that may be possible. According to some example embodiments, without color information, a mouth corner detector may be designed based on a gradient and the Hough transform. Considering the symmetry of a mouth, a mouth, for example as depicted in image 170 of FIG. 7, may be modeled as several parabolas as depicted in image 172 of FIG. 7. The gradient map 174 may be calculated and transformed in the Hough domain as depicted in image 176. Since the mouth corner may be the intersection of the parabolas, the mouth corner may correspond to a straight line with several local minima in Hough domain. As such, the line which has the maximum average accumulating value on an accumulation map 178 may correspond to the mouth corners as depicted in image 180.

Having described the makeup of the database 114, the example method of FIG. 1 may be described that utilizes the content of the database 114. An input image 100 may be first received or captured by an electronic device for analysis. The input image may be first subjected to face detection at 102 to determine whether a face is present in the input image. At 104, eye detection may be performed. In this regard, via face and eye detection, initial positions for the eye centers may be determined.

Based on these initial eye positions, pose parameters may be estimated and image normalization may be performed at 106 and represented by image 108. The estimated pose parameters may include a rotated angle α, a scaling factor s, and displacements dx and dy. The input image may be normalized using the pose parameters. For example, the input image may be shifted to place a midpoint between the initial eye positions at a predefined coordinate, such as (80, 60). The input image may also be scaled such that the distance between the eye positions is a predefined distance, for example, 60 units. At 110, local binary pattern values may be determined as indicated in the image 112.

Via eye state classification at 128, the eye state may be determined to be closed or open and a global shape model may be selected. In this regard, according to some example embodiments, six global feature points from eye and nose components (triangles in FIG. 2) may be considered when selecting the global shape model and thereby obtain an initial positions for facial feature points via a mean shape associated with the global shape model. These global feature points may be subsequently processed using the global shape model and the corresponding texture model or models.

In this regard, the corresponding texture model for eye feature points, based on the state (open or closed) of the eyes, may be selected. Using the selected texture model constructed via the logarithm likelihood ratio as described in equation (3), the global feature points may be searched and located at 130 and as depicted in image 132. The updated pose parameters (α',s',dx',dy') may be calculated based on the relationship between the mean shape $\overline{X}''$ and the normalized image. Then the mean shape $\overline{X}$ may be adjusted and projected onto the normalized image at 134, as depicted in image 136, thereby, according to some example embodiments, reducing or eliminating the inaccuracy of eye detection.

Mouth corner detection and state classification may be performed at 138 and as depicted in image 140 to select one of the three states of the local shape and texture models for the mouth. For the eyebrows, the single local shape and texture model may be utilized, and for the eyes, the local shape and texture model for the appropriate state may be utilized. Using the local shape and texture models for each component, the feature points may be searched and located as $X_{new}$ at 142 and as depicted in image 144, and the feature points may be projected to the original input image at 146 and as depicted in image 148.

According to various example embodiments, performing a search using the shape model may be constrained by the PDM (point distribution model), statistical shape model and principle component analysis (PGA) introduced by the shape models. An improved position of a feature point as a result of the example method may be one that is closer to the edge of an object or feature (e.g., a mouth) as indicated by the coloring of the pixels. As such, points may be determined that are positioned at the edges of an object or feature. The positions of the points may be updated accordingly.

Figure 8:
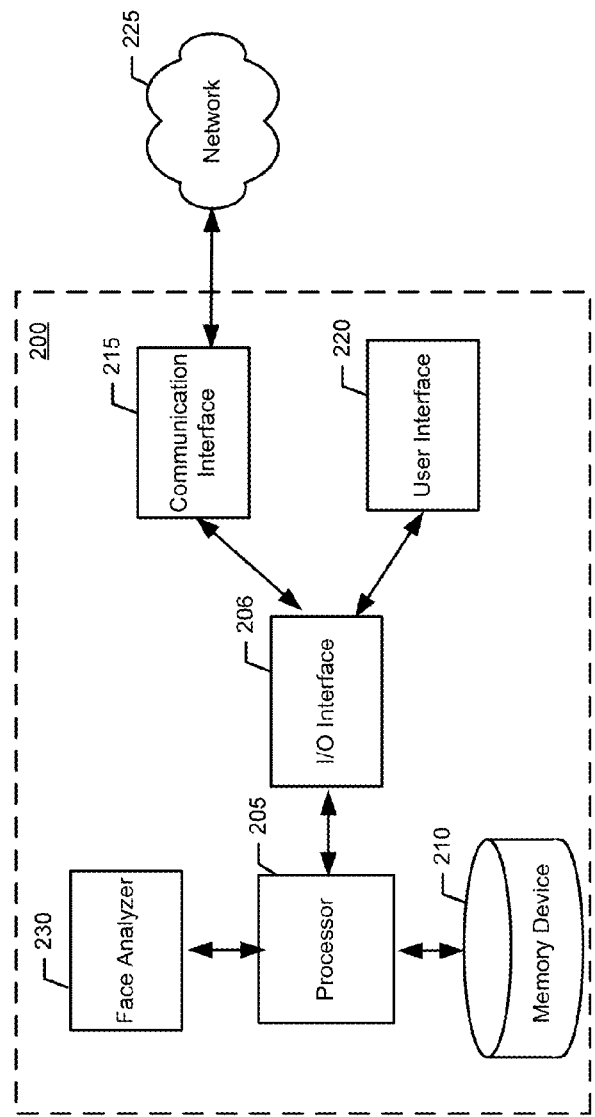
FIG. 8 illustrates an example apparatus and associated system configured to perform local binary pattern based facial feature localization according to an example embodiment of the present invention.
Figure 9:
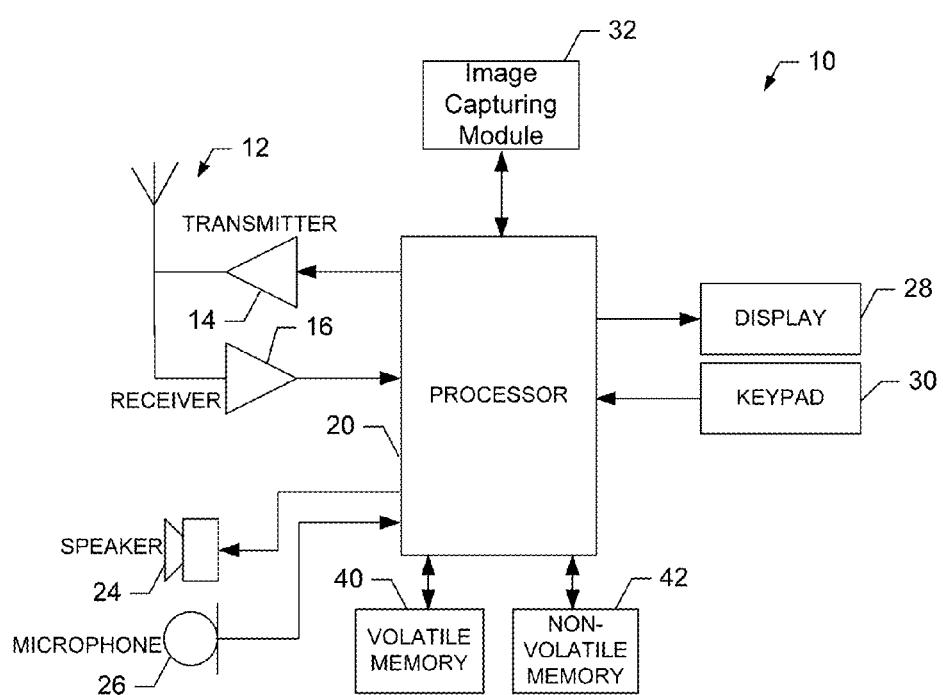
FIG. 9 illustrates a mobile terminal configured for local binary pattern based facial feature localization according to an example embodiment of the present invention.

The description provided above and generally herein illustrates example methods, example apparatuses, and example computer program products for local binary pattern based facial feature localization. FIG. 8 depicts an example apparatus that is configured to perform various functionalities as described with respect to FIGS. 1-7, and as generally described herein. FIG. 9 depicts another example apparatus in the form of a specific mobile terminal that may be configured to operate as described with respect to FIGS. 1-7, and as generally described herein. The example apparatuses depicted in FIGS. 8 and 9 may also be configured to perform example methods of the present invention, such as the example methods described with respect to FIG. 10.

Referring now to FIG. 8, in some example embodiments, the apparatus 200 may, be embodied as, or included as a component of, a communications device with wired or wireless communications capabilities. In some example embodiments, the apparatus 200 may be part of a communications device, such as a stationary or a mobile terminal. As a mobile terminal, the apparatus 200 may be a mobile computer, mobile telephone, a portable digital assistant (PDA), a pager, a mobile television, a gaming device, a camera, a video recorder, an audio/video player, a radio, and/or a global positioning system (GPS) device, any combination of the aforementioned, or the like. Regardless of the type of communications device, apparatus 200 may also include computing capabilities.

The example apparatus 200 includes or is otherwise in communication with a processor 205, a memory device 210, an Input/Output (I/O) interface 206, a communications interface 215, user interface 220, and a face analyzer 230. The processor 205 may be embodied as various means for implementing the various functionalities of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, processor 205 may be representative of a plurality of processors, or one or more multiple core processors, operating in concert. Further, the processor 205 may be comprised of a plurality of transistors, logic gates, a clock (e.g., oscillator), other circuitry, and the like to facilitate performance of the functionality described herein. The processor 205 may, but need not, include one or more accompanying digital signal processors.

In some example embodiments, the processor 205 is configured to execute instructions stored in the memory device 210 or instructions otherwise accessible to the processor 205. The processor 205 may be configured to operate such that the processor causes the apparatus 200 to perform various functionalities described herein.

Whether configured as hardware or via instructions stored on a computer-readable storage medium, or by a combination thereof, the processor 205 may be an entity capable of performing operations according to embodiments of the present invention while configured accordingly. Thus, in example embodiments where the processor 205 is embodied as, or is part of, an ASIC, FPGA, or the like, the processor 205 is specifically configured hardware for conducting the operations described herein. Alternatively, in example embodiments where the processor 205 is embodied as an executor of instructions stored on a computer-readable storage medium, the instructions specifically configure the processor 205 to perform the algorithms and operations described herein. In some example embodiments, the processor 205 is a processor of a specific device (e.g., a mobile terminal) configured for employing example embodiments of the present invention by further configuration of the processor 205 via executed instructions for performing the algorithms, methods, and operations described herein.

The memory device 210 may be one or more computer-readable storage media that may include volatile and/or non-volatile memory. In some example embodiments, the memory device 210 includes Random Access Memory (RAM) including dynamic and/or static RAM, on-chip or off-chip cache memory, and/or the like. Further, memory device 210 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 210 may include a cache area for temporary storage of data. In this regard, some or all of memory device 210 may be included within the processor 205.

Further, the memory device 210 may be configured to store information, data, applications, computer-readable program code instructions, and/or the like for enabling the processor 205 and the example apparatus 200 to carry out various functions in accordance with example embodiments of the present invention described herein. For example, the memory device 210 could be configured to buffer input data for processing by the processor 205. Additionally, or alternatively, the memory device 210 may be configured to store instructions for execution by the processor 205.

The I/O interface 206 may be any device, circuitry, or means embodied in hardware, software, or a combination of hardware and software that is configured to interface the processor 205 with other circuitry or devices, such as the communications interface 215 and the user interface 220. In some example embodiments, the processor 205 may interface with the memory 210 via the I/O interface 206. The I/O interface 206 may be configured to convert signals and data into a form that may be interpreted by the processor 205. The I/O interface 206 may also perform buffering of inputs and outputs to support the operation of the processor 205. According to some example embodiments, the processor 205 and the I/O interface 206 may be combined onto a single chip or integrated circuit configured to perform, or cause the apparatus 200 to perform, various functionalities of the present invention.

The communication interface 215 may be any device or means embodied in either hardware, a computer program product, or a combination of hardware and a computer program product that is configured to receive and/or transmit data from/to a network 225 and/or any other device or module in communication with the example apparatus 200. The communications interface may be configured to communicate information via any type of wired or wireless connection, and via any type of communications protocol. Processor 205 may also be configured to facilitate communications via the communications interface by, for example, controlling hardware included within the communications interface 215. In this regard, the communication interface 215 may include, for example, one or more antennas, a transmitter, a receiver, a transceiver and/or supporting hardware, including, for example, a processor for enabling communications. Via the communication interface 215, the example apparatus 200 may communicate with various other network entities in a device-to-device fashion and/or via indirect communications via a base station, access point, server, gateway, router, or the like.

The user interface 220 may be in communication with the processor 205 to receive user input via the user interface 220 and/or to present output to a user as, for example, audible, visual, mechanical or other output indications. The user interface 220 may include, for example, a keyboard, a mouse, a joystick, a display (e.g., a touch screen display), a microphone, a speaker, or other input/output mechanisms. Further, the processor 205 may comprise, or be in communication with, user interface circuitry configured to control at least some functions of one or more elements of the user interface. The processor 205 and/or user interface circuitry may be configured to control one or more functions of one or more elements of the user interface through computer program instructions (e.g., software and/or firmware) stored on a memory accessible to the processor 205 (e.g., volatile memory, non-volatile memory, and/or the like). In some example embodiments, the user interface circuitry is configured to facilitate user control of at least some functions of the apparatus 200 through the use of a display and configured to respond to user inputs. The processor 205 may also comprise, or be in communication with, display circuitry configured to display at least a portion of a user interface, the display and the display circuitry configured to facilitate user control of at least some functions of the apparatus 200. According to some example embodiments, the user interface 220 may include the hardware needed to support camera or video functionality for capturing an image, such as an image that includes a face.

The face analyzer 230 of example apparatus 200 may be any means or device embodied, partially or wholly, in hardware, a computer program product, or a combination of hardware and a computer program product, such as processor 205 implementing stored instructions to configure the example apparatus 200, memory device 210 storing executable program code instructions configured to carry out the functions described herein, or a hardware configured processor 205 that is configured to carry out the functions of the face analyzer 230 as described herein. In an example embodiment, the processor 205 includes, or controls, the face analyzer 230. The face analyzer 230 may be, partially or wholly, embodied as processors similar to, but separate from processor 205. In this regard, the face analyzer 230 may be in communication with the processor 205. In various example embodiments, the face analyzer 230 may, partially or wholly, reside on differing apparatuses such that some or all of the functionality of the face analyzer 230 may be performed by a first apparatus, and the remainder of the functionality of the face analyzer 230 may be performed by one or more other apparatuses.

The apparatus 200 and the processor 205 may be configured to perform the following functionality via the face analyzer 230. In this regard, the face analyzer 230 may be configured to cause the processor 205 and/or the apparatus 200 to perform various functionalities, such as those depicted in the flowchart of FIG. 10 and as generally described herein. For example, the face analyzer 230 may be configured to obtain an input image at 400 and determine initial eye center positions via eye detection at 410. Further, the face analyzer 230 may be configured to normalize and scale the input image based on the initial eye center positions at 420.

According to various example embodiments, the face analyzer 230 may also be configured to determine an eye state classification of the input image at 430 and select a texture model for a global shape and an associated mean shape based on the eye center positions and the eye state classification at 440. In this regard, the texture model may be a local binary pattern model determined based on a probability density. According to some example embodiments, selecting the texture model may include selecting the texture model from a collection of models for an open eye state and closed eye state. Additionally, the face analyzer 230 may also be configured to adjust, at 450, location of feature points defined by the mean shape based on the texture model for the global shape and an associated shape model. According to some example embodiments, adjusting the locations of the feature points includes adjusting the locations of the feature points based on the associated global shape model, wherein the global shape model is included within a hierarchical shape model.

Further, the face analyzer 230 may also be configured to perform a mouth corner detection and a mouth state classification at 460, and, at 470, select a local shape model and an associated local texture modal for a given facial component based on the given component's current state. The face analyzer 230 may be configured to further adjust the feature points associated with a given facial component based on the local shape model and the associated texture model for the given facial component at 480.

Referring now to FIG. 9, a more specific example apparatus in accordance with various embodiments of the present invention is provided. The example apparatus of FIG. 9 is a mobile terminal 10 configured to communicate within a wireless network, such as a cellular communications network. The mobile terminal 10 may be configured to perform the functionality described with respect to the apparatus 200 and as generally described herein. More specifically, the mobile terminal 10 may be caused to perform the functionality of the face analyzer 230 via the processor 20. In this regard, processor 20 may be an integrated circuit or chip configured similar to the processor 205 together with, for example, the I/O interface 206. Further, volatile memory 40 and non-volatile memory 42 may configured to support the operation of the processor 20 as computer readable storage media.

The mobile terminal 10 may also include an antenna 12, a transmitter 14, and a receiver 16, which may be included as parts of a communications interface of the mobile terminal 10. The speaker 24, the microphone 26, the display 28 (which may be a touch screen display), and the keypad 30 may be included as parts of a user interface.

In some example embodiments, the mobile terminal 10 may also include an image capturing module 32, such as a camera, video and/or audio module, in communication with the processor 20. The image capturing module 32 may be any means for capturing images, video and/or audio for storage, display, or transmission. For example, in an exemplary embodiment in which the image capturing module 32 is a camera, the camera may be configured to form and save a digital image file from an image captured by the camera.

The image capturing module 32 can include all hardware, such as a lens or other optical component(s), and software necessary for creating a digital image file from a captured image. The image capturing module 32 may also include all hardware, such as a lens or other optical component(s), and software necessary to provide various image capturing functionality, such as, for example, image zooming functionality. Image zooming functionality can include the ability to magnify or de-magnify an image prior to or subsequent to capturing an image.

Alternatively, the image capturing module 32 may include only the hardware needed to view an image, while a memory device, such as the volatile memory 40 or non-volatile memory 42 stores instructions for execution by the processor 20 in the form of software necessary to create a digital image file from a captured image. In an exemplary embodiment, the image capturing module 32 may further include a processor or co-processor which assists the processor 20 in processing image data and an encoder and/or decoder for compressing and/or decompressing image data. The encoder and/or decoder may encode and/or decode according to, for example, a joint photographic experts group (JPEG) standard or other format.

Figure 10:
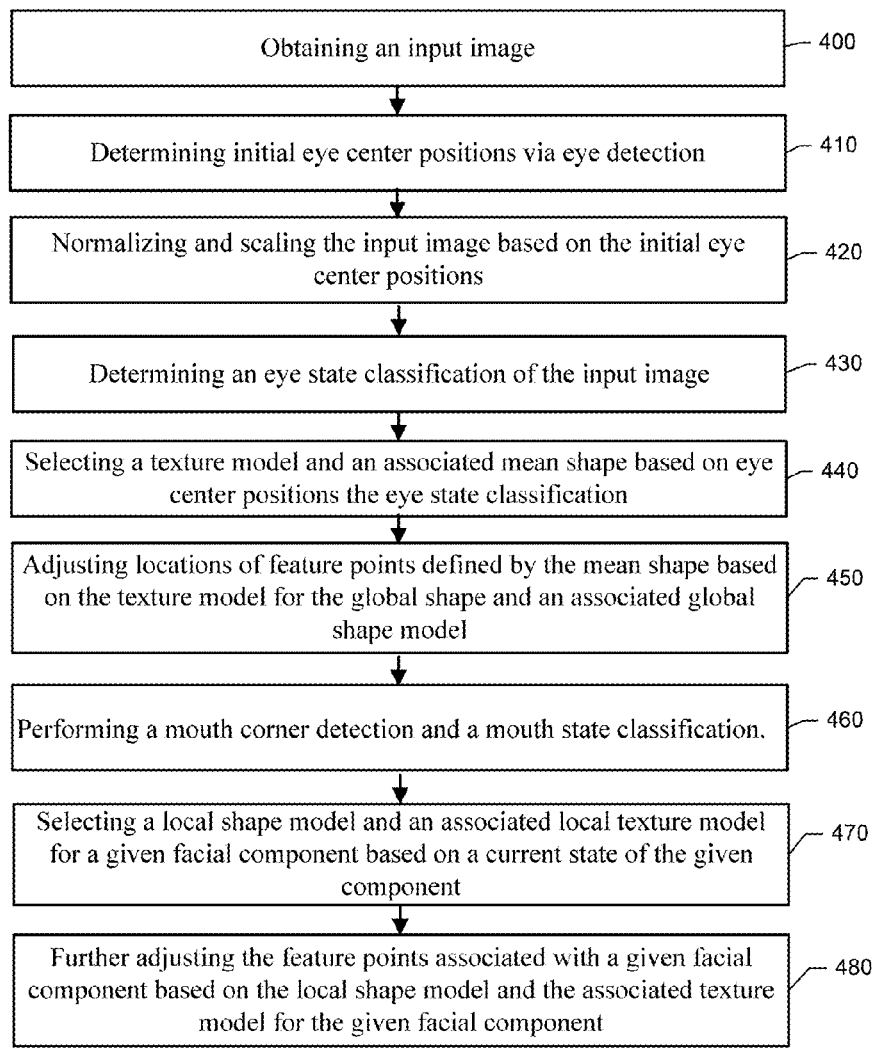
FIG. 10 illustrates a flow chart of a method for local binary pattern based facial feature localization according to an example embodiment of the present invention.

FIG. 10 illustrates flowcharts of example systems, methods, and/or computer program products according to example embodiments of the invention. It will be understood that each operation of the flowcharts, and/or combinations of operations in the flowcharts, can be implemented by various means. Means for implementing the operations of the flowcharts, combinations of the operations in the flowchart, or other functionality of example embodiments of the present invention described herein may include hardware, and/or a computer program product including a computer-readable storage medium (as opposed to a computer-readable transmission medium which describes a propagating signal) having one or more computer program code instructions, program instructions, or executable computer-readable program code instructions stored therein. In this regard, program code instructions may be stored on a memory device, such as memory device 210, of an example apparatus, such as example apparatus 200, and executed by a processor, such as the processor 205. As will be appreciated, any such program code instructions may be loaded onto a computer or other programmable apparatus (e.g., processor 205, memory device 210, or the like) from a computer-readable storage medium to produce a particular machine, such that the particular machine becomes a means for implementing the functions specified in the flowcharts' operations. These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' operations. The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowcharts' operations.

Accordingly, execution of instructions associated with the operations of the flowchart by a processor, or storage of instructions associated with the blocks or operations of the flowcharts in a computer-readable storage medium, support combinations of operations for performing the specified functions. It will also be understood that one or more operations of the flowcharts, and combinations of blocks or operations in the flowcharts, may be implemented by special purpose hardware-based computer systems and/or processors which perform the specified functions, or combinations of special purpose hardware and program code instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
    determining an eye state classification of an input image;
    selecting, using a processor, a texture model for a global shape and an associated mean shape based on eye center positions and the eye state classification, wherein the mean shape comprises all feature points and the global shape model comprises a face frame based on a plurality of fixed points in the input image, wherein the texture model for the global shape is a local binary pattern model determined based on a probability density; and
    adjusting locations of feature points defined by the mean shape based on the texture model for the global shape and an associated global shape model.

2. The method of claim 1 further comprising:
    obtaining the input image;
    determining initial eye center positions via eye detection; and
    normalizing and scaling the input image based on the initial eye center positions.

3. The method of claim 1, wherein adjusting the locations of the feature points includes adjusting the locations of the feature points based on the associated global shape model, wherein the global shape model is included within a hierarchical shape model.

4. The method of claim 3, wherein the hierarchical shape model comprises a global shape model, a plurality of local shape models, and a mean shape model.

5. The method of claim 4, wherein the plurality of local shape models are based on the global shape model and the mean shape model is based on the plurality of local shape models, wherein the local shape models comprises feature points for a respective facial component.

6. The method of claim 1, wherein selecting the texture model for the global shape includes selecting the texture model from a collection of models for an open eye state and closed eye state.

7. The method of claim 1 further comprising performing a mouth corner detection and a mouth state classification.

8. The method of claim 1 further comprising:
    performing a mouth corner detection and a mouth state classification;
    selecting a local shape model and an associated local texture model for a given facial component based on a current state of the given component, the associated local texture model being a local binary pattern model determined on a probability density; and
    further adjusting the feature points associated with a given facial component based on the local shape model and the associated texture model for the given facial component.

9. An apparatus comprising at least one processor and at least one memory including computer program code, the at least one memory and the computer program code configured to, with the at least one processor, cause the apparatus at least to perform:
    determine an eye state classification of an input image;
    select a texture model for a global shape and an associated mean shape based on eye center positions and the eye state classification, wherein the mean shape comprises all feature points and the global shape model comprises a face frame based on a plurality of fixed points in the input image, wherein the texture model for the global state is a local binary pattern model determined based on a probability density; and
    adjust locations of feature points defined by the mean shape based on the texture model for the global shape model and an associated global shape model.

10. The apparatus of claim 9, wherein the apparatus is further caused to:
    obtain the input image;
    determine initial eye center positions via eye detection; and
    normalize and scale the input image based on the initial eye center positions.

11. The apparatus of claim 9, wherein the apparatus caused to adjust the locations of the feature points includes adjusting the locations of the feature points based on the associated global shape model, wherein the global shape model is included within a hierarchical shape model.

12. The apparatus of claim 11, wherein the hierarchical shape model comprises a mean shape model, a global shape model, a local shape model and a mean shape model.

13. The apparatus of claim 12, wherein the plurality of local shape models are based on the global shape model and the mean shape model is based on the plurality of local shape models, wherein the local shape models comprises feature points for a respective facial component.

14. The apparatus of claim 9, wherein the apparatus caused to select the texture model for the global shape includes being caused to select the texture model from a collection of models for an open eye state and closed eye state.

15. The apparatus of claim 9, wherein the apparatus is further caused to perform mouth corner detection and mouth state classification.

16. The apparatus of claim 9, wherein the apparatus is further caused to:
- detect mouth corners and classify a mouth state;
- select a local shape model and an associated local texture model for a given facial component based on a current state of the given component, the associated local texture model being a local binary pattern model determined on a probability density; and
- further adjust the feature points associated with a given facial component based on the local shape model and the associated texture model for the given facial component.

17. The apparatus of claim 9, wherein the apparatus comprises a mobile terminal; and wherein the apparatus further comprises user interface circuitry and user interface software configured to facilitate user control of at least some functions of the mobile terminal through the use of a display and configured to respond to user inputs, and a display and display circuitry configured to display at least a portion of a user interface of the mobile terminal, the display and the display circuitry configured to facilitate user control of at least some functions of mobile terminal.

18. The apparatus of claim 17, further comprising image capturing circuitry configured to capture an image including a face.

19. A computer program product comprising a non-transitory computer readable storage medium having computer program code stored thereon, the computer program code being configured to, when executed, cause an apparatus to perform:
- determining an eye state classification of an input image;
- selecting a texture model for a global shape and an associated mean shape based on eye center positions and the eye state classification, wherein the mean shape comprises all feature points and the global shape model comprises a face frame based on a plurality of fixed points in the input image, wherein the texture model for the global shape is a local binary pattern model determined based on a probability density; and
- adjusting locations of feature points defined by the mean shape based on the texture model for the global shape and an associated shape model.

20. The computer program product of claim 19, wherein the computer program code is further configured to cause the apparatus to perform:
- obtaining the input image;
- determining initial eye center positions via eye detection; and
- normalizing and scaling the input image based on the initial eye center positions.

21. The computer program product of claim 19, wherein the computer program code configured to cause the apparatus to perform adjusting the locations of the feature points includes being configured to cause the apparatus to perform adjusting the locations of the feature points based on the associated global shape model, wherein the global shape model is included within a hierarchical shape model.

22. The computer program product of claim 21, wherein the hierarchical shape model comprises a global shape model, a plurality of local shape models, and a mean shape model.

23. The method of claim 22, wherein the plurality of local shape models are based on the global shape model and the mean shape model is based on the plurality of local shape models, wherein the local shape models comprises feature points for a respective facial component.

24. The computer program product of claim 19, wherein the computer program code configured to cause the apparatus to perform selecting the texture model for global shape includes being configured to cause the apparatus to perform selecting the texture model from a collection of models for an open eye state and closed eye state.

25. The computer program product of claim 19, wherein the computer program code is further configured to cause the apparatus to perform mouth corner detection and mouth state classification.

26. The computer program product of claim 19, wherein the computer program code is further configured to cause the apparatus to perform:
- performing a mouth corner detection and a mouth state classification;
- selecting a local shape model and an associated local texture model for a given facial component based on a current state of the given component, the associated local texture model being a local binary pattern model determined on a probability density; and
- further adjusting the feature points associated with a given facial component based on the local shape model and the associated texture model for the given facial component.

* * * * *